March 24, 1931. C. FROESCH 1,797,858
BUS
Filed Nov. 15, 1927 3 Sheets-Sheet 1
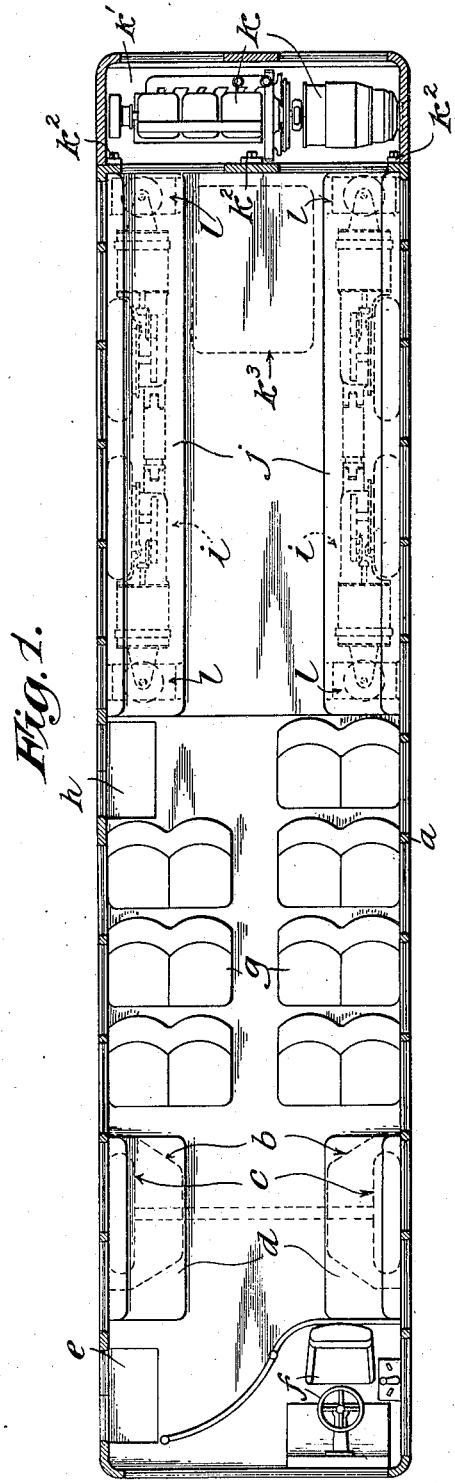
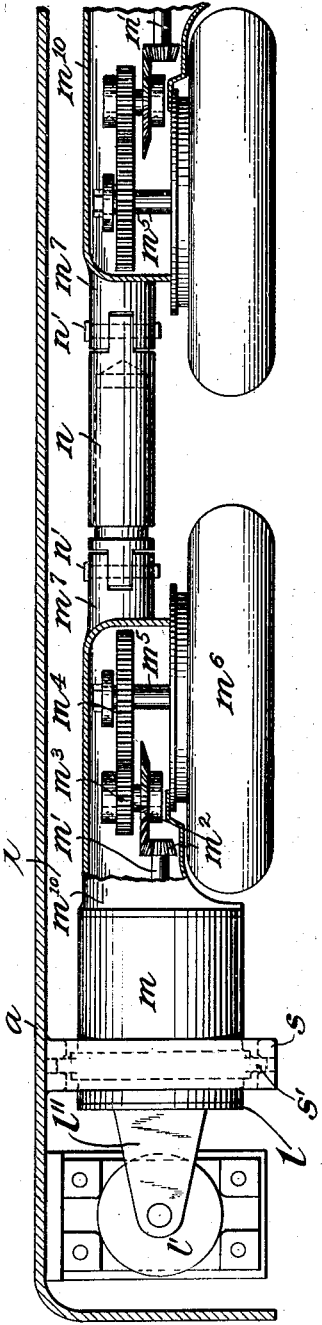
Inventor:
Charles Froesch
By his Attorneys
Redding, Greeley, O'Shea + Campbell March 24, 1931. C. FROESCH 1,797,858
BUS
Filed Nov. 15, 1927 3 Sheets-Sheet 2
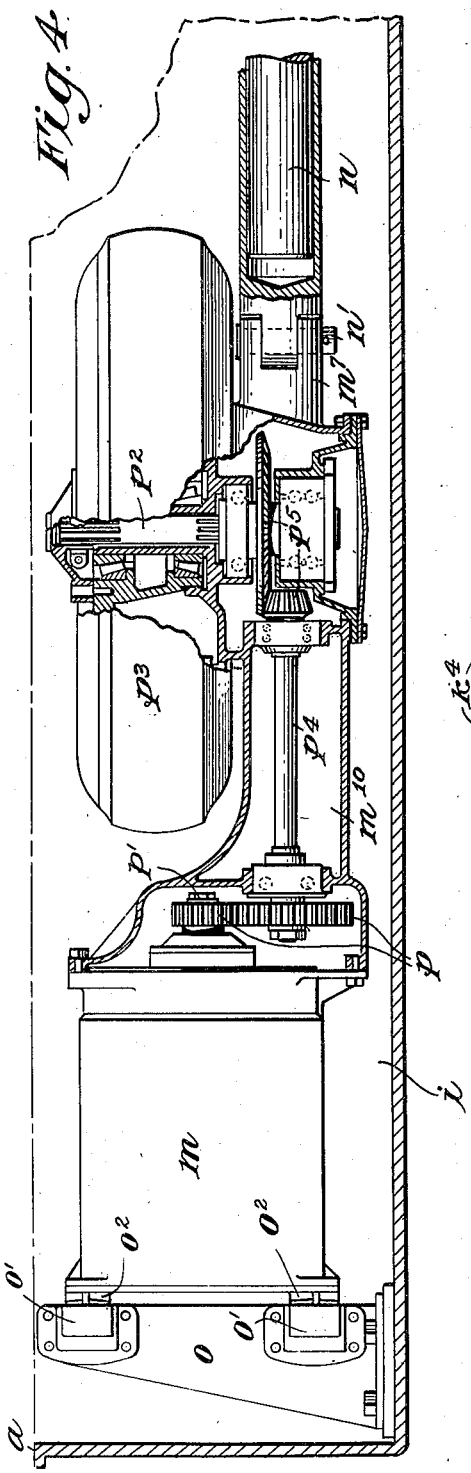
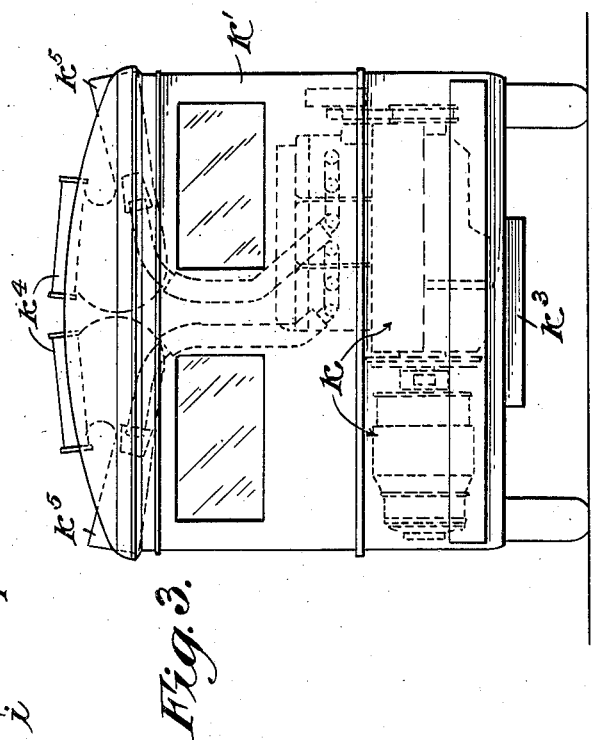
Inventor:
Charles Froesch
By his Attorneys
Redding, Greeley, O'Shea & Campbell March 24, 1931. C. FROESCH 1,797,858
BUS
Filed Nov. 15, 1927 3 Sheets-Sheet 3
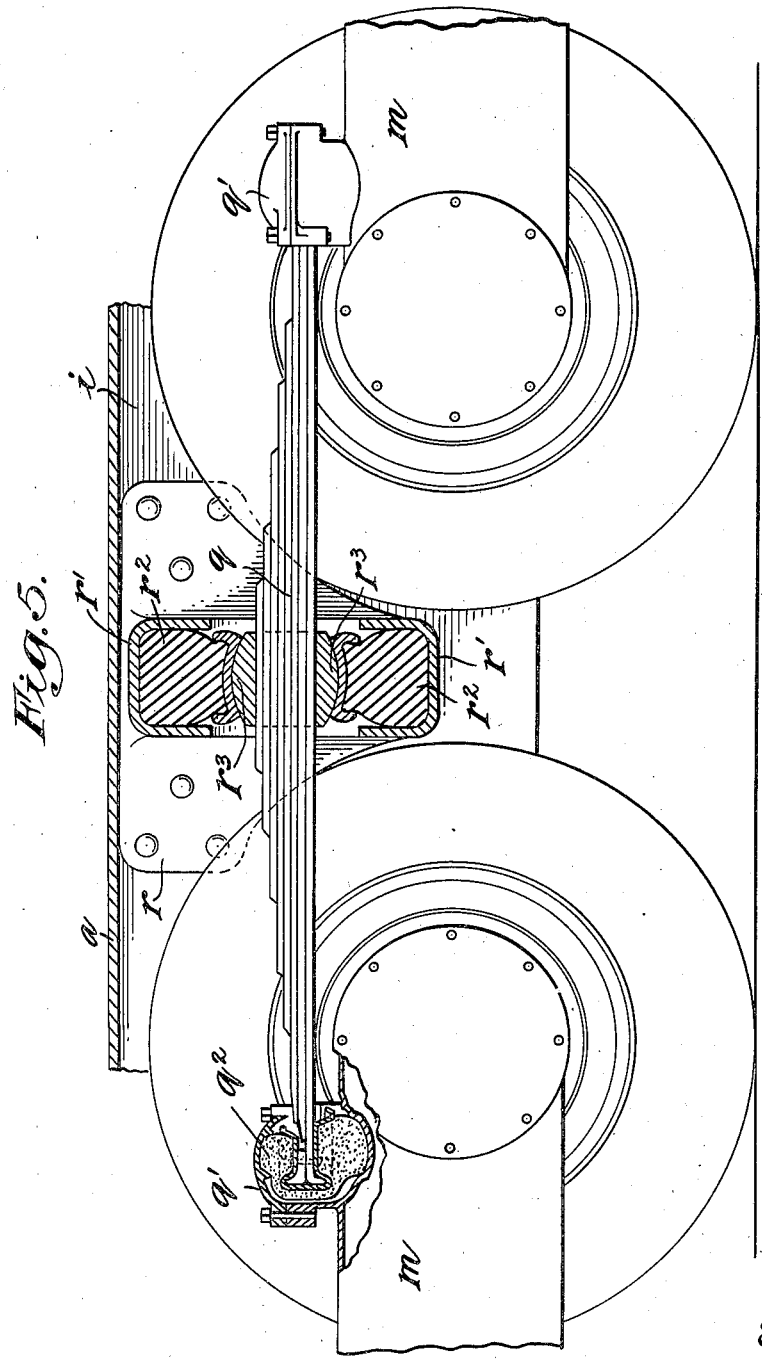
Inventor:
Charles Froesch
By his Attorneys
Redding, Greeley, O'Shea + Campbell Patented Mar. 24, 1931                                                    1,797,858

UNITED STATES PATENT OFFICE

CHARLES FROESCH, OF TEANECK, NEW JERSEY, ASSIGNOR TO INTERNATIONAL MOTOR COMPANY, OF NEW YORK, N. Y., A CORPORATION OF DELAWARE

BUS

Application filed November 15, 1927. Serial No. 233,344.

The present invention relates to road vehicles of the passenger carrying type, particularly those of the bus, or commercial passenger carrying type. Current and past practice has adhered to the conventional vehicle frame and chassis construction, wherein transversely extending axles at front and rear carry the weight of the vehicle and the power unit is disposed at the front of the chassis. This practice has been carried over from the trend of pleasure car development and when applied to buses of the larger class, results in unsatisfactory operation and manufacturing limitations.

An object of the present invention is to provide a vehicle construction wherein the serious disadvantages and limitations of the present practice are overcome. More particularly, the invention comprises the provision of a vehicle, the construction of which renders the driving and power units readily accessible and capable of being bodily removed without disturbing the body or chassis construction. By reason of this construction the steering of the vehicle is greatly improved and the interior, passenger carrying space is adapted to accommodate the easy loading and discharging of passengers.

A further object of the invention is to provide a body in which there is relatively great head room even though the overall height of the vehicle is not greater than those now in use. This is accomplished by dispensing with the through axles and dropping the floor to the lower available level.

Further objects will be apparent as the description proceeds in connection with the accompanying drawings wherein:

Figure 1 is a plan view in section, showing the layout of the interior of the vehicle and the disposition of the driving and power units.

Figure 2 is a plan view, partly in section, showing one type of driving unit.

Figure 3 is a rear elevational view of a vehicle constructed in accordance with the present invention.

Figure 4 is a view in section showing another type of driving unit.

Figure 5 is a view in section showing a modified suspension for the driving wheels.

Referring to Figures 1 and 3 the design of the interior of the vehicle will be readily apparent. $a$ indicates the vehicle body formed with side recesses $b$ for receiving the front steering wheels $c$. Over these recesses, longitudinal seats $d$ are provided, thus utilizing all space, not available for standing room, for seating space. At the front, and on one side of the body, a door $e$ is provided and the usual controlling mechanism and operator's seat $f$ is formed opposite the door $e$. At the mid-section of the body, seats $g$ are provided. Centrally of the body, a door $h$ is formed, this door serving as an exit while the front door $e$ serves as an entrance. Rearwardly of the door $h$, and on either side of the body, longitudinally extending recesses $i$ are formed in the body. Over these recesses side seats $j$ are constructed leaving ample standing room between the two side seats.

The power unit $k$, in this instance comprising an internal combustion engine and electric generator for supplying current to suitably mounted driving motors, is mounted transversely of the frame in a compartment $k'$ which forms a continuation of the body lines and is mounted detachably at $k^2$ so that it can be removed readily without disturbing the body of the vehicle. By removing the compartment as a unit, it is only necessary to disconnect the gasoline line and break the electric connections between the driving motors, controlling mechanism and the generator. The gasoline tank is indicated by dotted lines at $k^3$ and may be mounted under the floor of the vehicle. The compartment $k'$ carries, in the roof thereof, radiators $k^4$ for cooling the circulating fluid of the internal combustion engine, and exhaust eductors $k^5$ for causing a circulation of air through the radiators by means of the engine exhaust. Since the entire compartment is a unit, all of the auxiliary mechanism required for the power unit, such as radiators, etc., are bodily removable without disturbing the connections between the respective elements.

It will be seen, from Figure 1, that the driving units are mounted independently within the recesses $i$ at either side of the rear of the vehicle. The unsprung weight represented by these driving units is suitably mounted in cushioning means within the compartments $i$ and the driving units at either side of the frame are independent of one another. By dispensing with the usual axle connecting the wheels at either side of the body, the floor of the vehicle can be lowered considerably and the head room thereof correspondingly increased. One form of driving unit is illustrated in Figure 2, wherein a trunnion bracket $s$ supports the electric motor $m$ and housing $m^{10}$. Protruding arms $l''$, carried by brackets $l$ are connected to suitable cushioning means, such as a pneumatic cylinder $l'$. In the construction shown, there are two driving wheels in every compartment and individual driving motors for each wheel. The driving motors are mounted on housings $m$ which are secured to the trunnion bearing $s'$ and connected to the pneumatic cushioning means $l'$ and provided with extensions $m^{10}$. The motor shaft $m'$ extends into the extensions $m^{10}$ and carries bevel gears $m^2$. The extensions $m^{10}$ also carry double reduction gears $m^3$ and gears $m^4$ which are mounted upon jack shafts $m^5$, the latter being wholly mounted within the housing extensions $m^{10}$. This mechanism is unitary and serves to drive wheel $m^6$ which is mounted upon the jack shaft $m^5$. As there are two wheels in either compartment, each housing $m$ is mounted, at one end, through suitable cushioning elements described above, and the two housings are tied together at adjacent ends through telescoping tie-rod $n$, serving as a lost-motion connection. The elements of this tie-rod are pivotally secured at $n'$ to suitable extensions $m^7$ on the respective housings $m$. It will be seen that the mounting of the driving wheels within the compartments in the manner described above provides a floating construction in which each wheel is an independent driving unit. The body is cushioned upon these driving units by the cushioning elements $l'$ which mount the respective housings $m$ thereon.

In Figure 4, a modified type of drive, and means for mounting the housings upon the body are shown. A bracket $o$, corresponding to the bracket $l$ is provided with housings $o'$ carrying blocks of yielding non-metallic material, such as rubber. The motor housings $m$ are provided with rearwardly extending arms $o^2$ which extend within the housings $o'$ and are seated within the yielding material carried thereby. This mounting permits pivotal movement of the housings $m$ with respect to the bracket $o$. The motor housing $m$, with its extensions $m^{10}$ carries a modified form of drive, wherein spur gears $p$, driven from the motor shaft $p'$ supply power to the full floating jack shaft $p^2$ which drives the wheel $p^3$. The driven gear $p$ is mounted upon a drive shaft $p^4$ which drives the jack shaft $p^2$ through bevel gears $p^5$. This drive enables the center line of the motor to coincide more nearly with the longitudinal center line of the driving wheel $p^3$ and reduces the twisting due to the reaction of the load on the wheel.

Figure 5 shows a modified mounting for the wheels, wherein the two wheels are tied together by a spring $q$ mounted, at either end, in housings $q'$ formed on the motor housings $m$ and carrying blocks of yielding non-metallic material $q^2$ for cushioning either end of the spring. A bracket $r$ is mounted upon the body of the vehicle within the compartment $i$ and is formed with opposed seats $r'$ for receiving blocks of yielding non-metallic material $r^2$. Seats $r^3$ are carried by the spring $q$ and serve to mount the latter yieldingly to the frame through the blocks $r^2$. By placing the housings $q'$ beyond the vertical center line of the wheel, a greater spring length is obtained and a correspondingly better mounting results.

It will be seen from the above description, that the vehicle frame and body are mounted at independent points through the driving and steering wheels in a manner such that each element is readily accessible and independent from the others. By this construction, the several elements can be removed bodily and servicing of the vehicle is greatly improved. The construction of the interior of the body provides for ready loading and discharging of passengers and frees it from the usual congestion caused by the pay load.

I claim as my invention:—

1. A vehicle comprising a body, a passenger carrying portion, controlling means at the front of the body, a power unit comprising an engine and a generator, a unitary compartment at the rear of the body and forming a continuation of the body, means to mount the power unit in the compartment transversely of the vehicle, and means to permit removal thereof of the compartment and power unit from the body as a unit.

2. A vehicle comprising a body having a central aisle section, driving wheels at either side thereof, driving means out of the central aisle section, means to mount the driving means with the wheels, means to connect the driving means pivotally at one point to the body, means to cushion the pivotal connection, and means to connect it at another point to the body through a lost motion connection independent of the pivotal and cushioning connection.

3. A vehicle comprising a body, a plurality of driving wheels at either side thereof, the wheels on one side being independent of those on the other, means to connect the wheels at opposite sides of the wheel axes to the respective sides of the body and lost motion connections between the wheels at adjacent sides of the wheel axes of each side.

4. A vehicle comprising a body, a plurality of driving wheels at either side thereof, housings carried with the wheels, independent driving means for each wheel in the housings, independent means to connect the housings to the body and a single means to connect the housings together.

5. A vehicle comprising a body, a plurality of driving wheels at either side thereof, housings carried with the wheels, means to connect the housings at one end to the body, driving means independent for each wheel in the housings, means to drive the wheels from the driving means, and means to connect the housings together at their adjacent ends.

6. A vehicle comprising a body, a plurality of independent driving wheels at either side thereof, housings carried with the wheels, motors in the housings, jack shafts mounted at one end of the housings for driving the wheels, means carried in the housings for connecting the motors to the jack shafts, means to connect the housings at one end to the body, and a lost motion connection between the adjacent ends of the housings.

7. A vehicle comprising a body, a plurality of independent driving wheels at either side thereof, driving motors, housings therefor, means to connect the housings to the body, offset extensions secured to the housings, driving connections in the extensions, jack shafts carried by the extensions, wheels driven from the shafts, and means to connect the extensions together.

8. In a vehicle having dual rear axles and independent driving wheels for each axle, means to connect the wheels on the same side of the vehicle to permit relative movement therebetween, and motors with their axes in line and parallel to the plane of the wheels on each side of the vehicle, one motor driving each wheel.

9. The combination as claimed in claim 8 wherein the motors are unsprung.

This specification signed this 24th day of October, A. D. 1927.

CHARLES FROESCH.